(12) United States Patent
Kaady et al.

(10) Patent No.: US 6,766,551 B1
(45) Date of Patent: Jul. 27, 2004

(54) OVERHEAD WASHER FOR AUTOMATIC CAR WASHES

(75) Inventors: Charles M. Kaady, Portland, OR (US); Robert E. Bowman, Beaverton, OR (US)

(73) Assignee: Charles Kaady, Portland, OR (US)

( * ) Notice: Subject to any disclaimer, the term of this patent is extended or adjusted under 35 U.S.C. 154(b) by 108 days.

(21) Appl. No.: 10/266,859

(22) Filed: Oct. 7, 2002

Related U.S. Application Data

(63) Continuation-in-part of application No. 09/881,385, filed on Jun. 12, 2001, now abandoned.

(51) Int. Cl.[7] .................................................. B60S 3/04
(52) U.S. Cl. ........................................................ 15/97.3
(58) Field of Search ............................. 15/97.3, DIG. 2

(56) References Cited

U.S. PATENT DOCUMENTS

| | | | |
|---|---|---|---|
| 3,345,666 A | 10/1967 | Hanna et al. | 15/53.3 |
| 3,403,417 A | 10/1968 | Hanna et al. | 15/53.3 |
| 3,499,180 A | 3/1970 | Hurwitz | 15/97.3 |
| 3,504,394 A | 4/1970 | Weigele et al. | 15/362 |
| 3,510,898 A | 5/1970 | Tatara et al. | 15/4 |
| 3,517,405 A | 6/1970 | Hanna et al. | 15/97.3 |
| 3,673,626 A | 7/1972 | Lieffring | 15/97.3 |
| 3,683,441 A | 8/1972 | Fromme | 15/97.3 |
| 3,765,043 A | 10/1973 | Lesser | 15/97.3 |
| 3,859,686 A | 1/1975 | Breish | 15/97.3 |
| 3,862,460 A | 1/1975 | Rockafellow | 15/97.3 |
| 3,863,290 A | 2/1975 | Lesser | 15/229.1 |
| 3,940,821 A | 3/1976 | Moran | 15/97.3 |
| 4,057,866 A | 11/1977 | Belanger | 15/97.3 |
| 4,453,284 A | 6/1984 | Schleeter | 15/97.3 |
| 4,744,122 A | 5/1988 | Beer et al. | 15/97.3 |
| 4,756,040 A | 7/1988 | Sereny | 15/97.3 |
| 4,937,908 A | 7/1990 | McCadden | 15/97.3 |
| 5,098,023 A | 3/1992 | Burke | 239/373 |
| 5,167,044 A | 12/1992 | Belanger et al. | 15/4 |
| 5,669,981 A | 9/1997 | Stinnett et al. | 134/6 |
| 5,784,748 A | 7/1998 | Belanger et al. | 15/230.14 |
| 6,021,556 A | 2/2000 | Belanger et al. | 29/450 |

FOREIGN PATENT DOCUMENTS

| | | |
|---|---|---|
| DE | 1480412 | 8/1969 |
| JP | 1-122759 | 5/1989 |

*Primary Examiner*—Mark Spisich
(74) *Attorney, Agent, or Firm*—Klarquist Sparkman, LLP

(57) ABSTRACT

An overhead washer for use in automatic car wash installations utilizes washing curtains slit at their lower edges to provide rectangular washing panels positioned transversely of the curtains that are shorter in length and greater in width than has heretofore been known.

13 Claims, 6 Drawing Sheets

OVERHEAD WASHER FOR AUTOMATIC CAR WASHES

OVERHEAD WASHER FOR AUTOMATIC CAR WASHES

This application is a continuation-in-part of our U.S. patent application Ser. No. 09/881,385, filed Jun. 12, 2001, now abandoned.

FIELD OF THE INVENTION

This invention relates to overhead washers used in automatic car washes. More particularly, it relates to overhead washers wherein depending sheets of thick, wetted, felt-like material are suspended in the path of a moving vehicle, the sheets being slit to provide strands or panels reciprocated transversely of the vehicle and supplied with hot, soapy water.

BACKGROUND OF THE INVENTION

Overhead car washers of the above type are well known and commonly used in automatic car wash installations. They were first disclosed in Hanna et al., U.S. Pat. Nos. 3,345,666, 3,403,417 and 3,517,405. The washer typically includes an overhead carriage, a support for the carriage, and a drive mechanism for moving the carriage back and forth across the path of a vehicle as the vehicle moves through the apparatus. Typically, a plurality of rectangular curtains are suspended firm the carriage into the path of the vehicle and reciprocated transversely by the carriage back and forth across the vehicle to wash it.

Heretofore, the curtains have been slit so as to provide a multiplicity of depending ribbons or strands, generally about 72 inches long and varying from about two inches to about six inches in width. The curtains are typically made of thick, flexible, felt-like material, generally about 5/16 of an inch thick and often sold as carpet padding under the trademark "Ozite"®.

Washers utilizing these elongated, relatively narrow strands have functioned well in the past as respects the shape of ordinary passenger cars. However, with the advent of larger vehicles, such as sport utility vehicles, minivans and station wagons of various body configurations, it has been discovered that the longer strands often fall away to the sides of the vehicle. Thus, they fail adequately to cover the generally flat surfaces of the hood, top and back of the vehicle. When such a vehicle is transported through the washer by the usual car wash conveyor, the long narrow ribbons or strands often miss parts of the hood, windshield, top, and/or rear window by failing to overlap completely. Thus, the washer often leaves portions of such surfaces unwashed.

It is thus the principal object of the present invention to provide an improved overhead washer for use in car wash installations and that will serve adequately to wash the many different vehicle configurations now favored by the American driving public.

A further object of the invention is to provide an overhead washer wherein the suspended curtains are slit so as to conform to the vehicle better than those previously known, thereby to wash the hood, windshield, top and rear portions of the vehicle more satisfactorily than has been possible heretofore.

SUMMARY OF THE INVENTION

Our improved overhead washer utilizes the typical plurality of rectangular curtains that are suspended from a carriage into the path of a vehicle and reciprocated transversely across the vehicle as it moves through the car washing installation. The curtains comprise sheets of thick, substantially napless, felt-like material that are unslit at the upper edges. The curtains are slit at their lower ends to form a plurality of flexible rectangular washing panels positioned transversely of the curtain. However, the curtains are slit such that a plurality of the panels are shorter in length and greater in width than has heretofore been known. Generally, the panels are less than about 24 inches in length. The lower edges of these shorter and wider panels all lie in a straight line when the curtains are at rest.

The shorter washing panels may all be substantially equal in width, or they may be unequal in width. They may all be substantially equal in length or they may be unequal in length, but their lengths arc all less than about 24 inches

DETAILED DESCRIPTION

Figure 1:
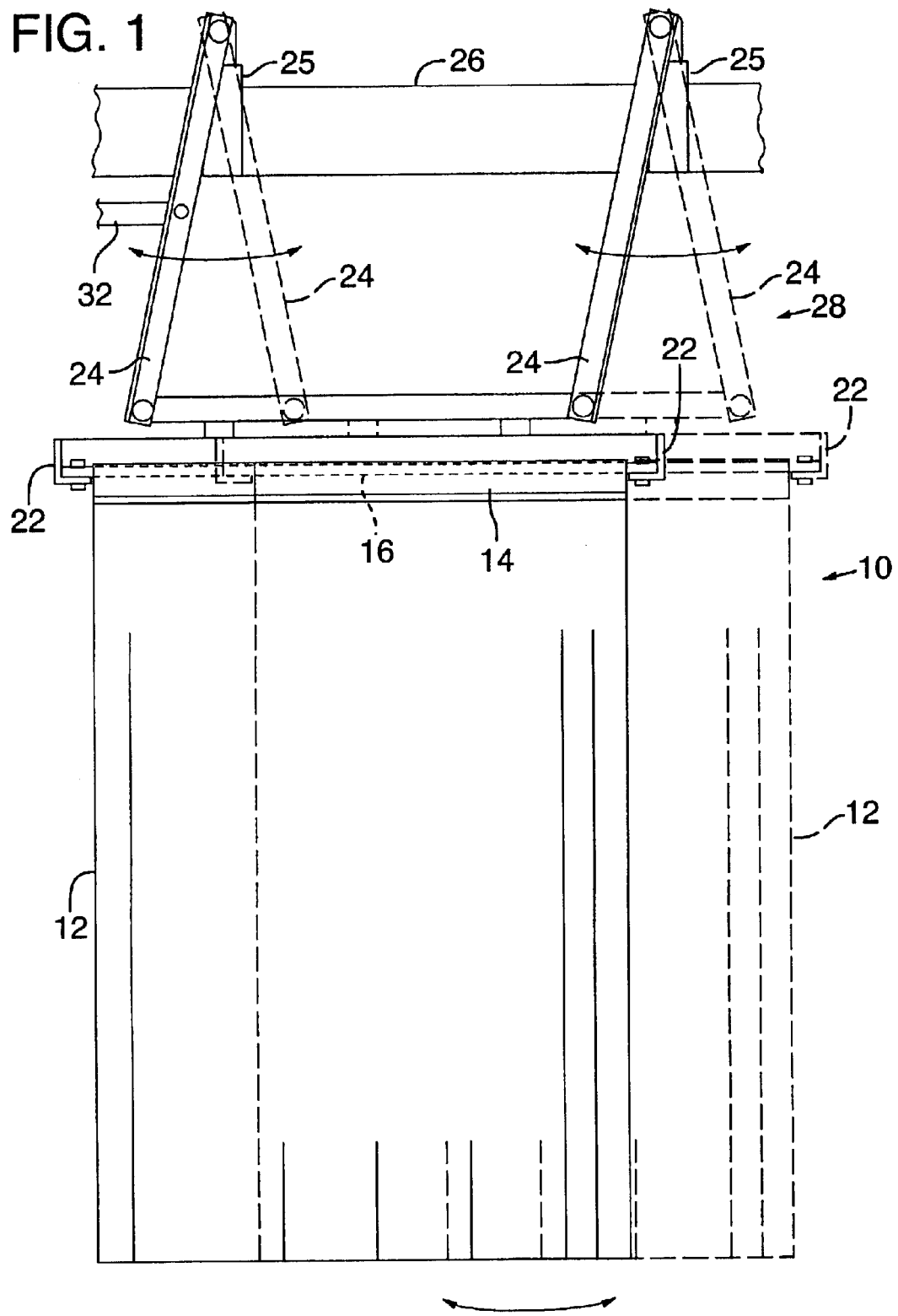
FIG. 1 is an elevational view of our washer illustrating in solid lines and in dotted lines, respectively, the two limiting positions the washer takes during its reciprocating movement.
Figure 2:
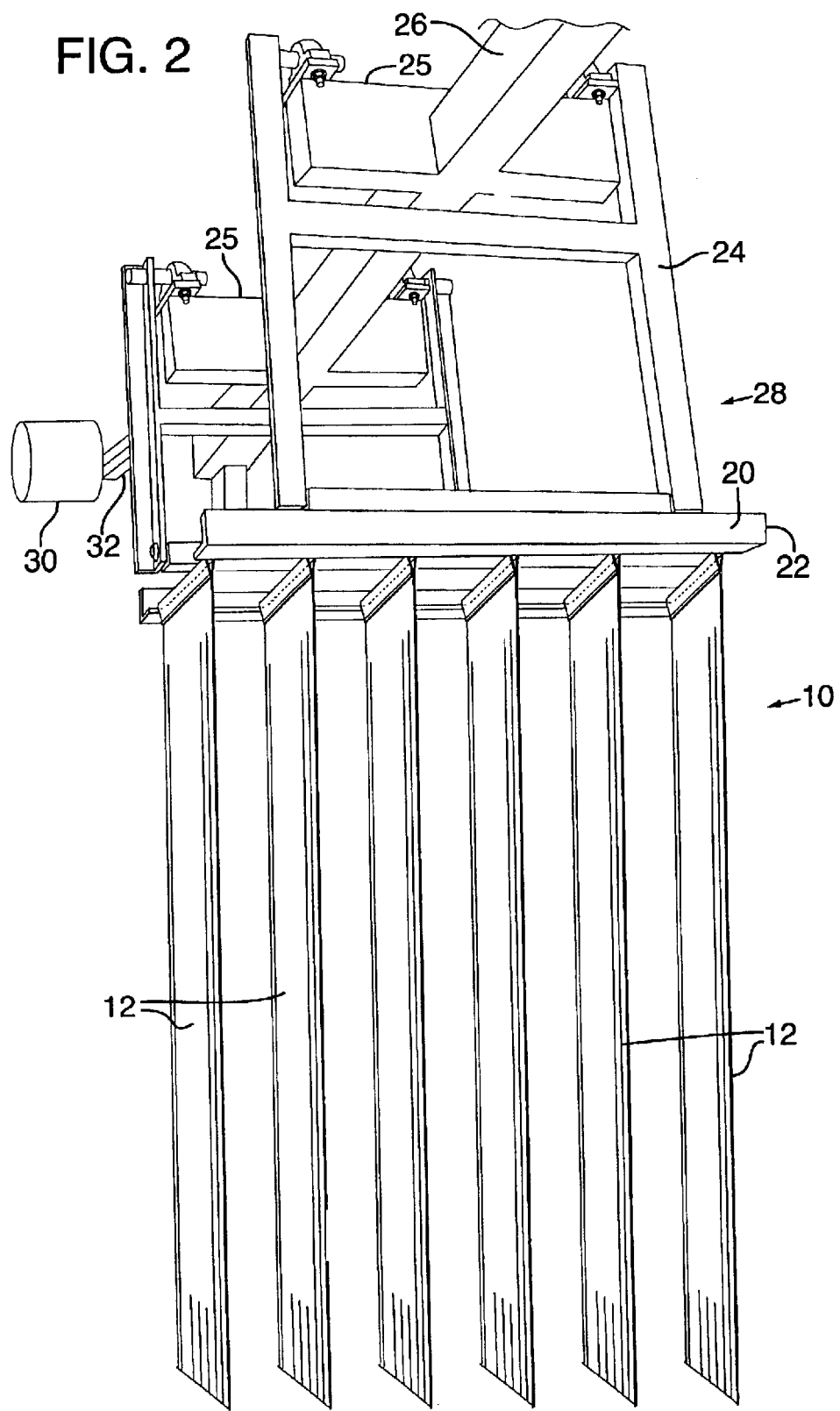
FIG. 2 is a perspective view of the washer, taken generally from the side, illustrating the supporting and drive mechanisms.
Figure 3:
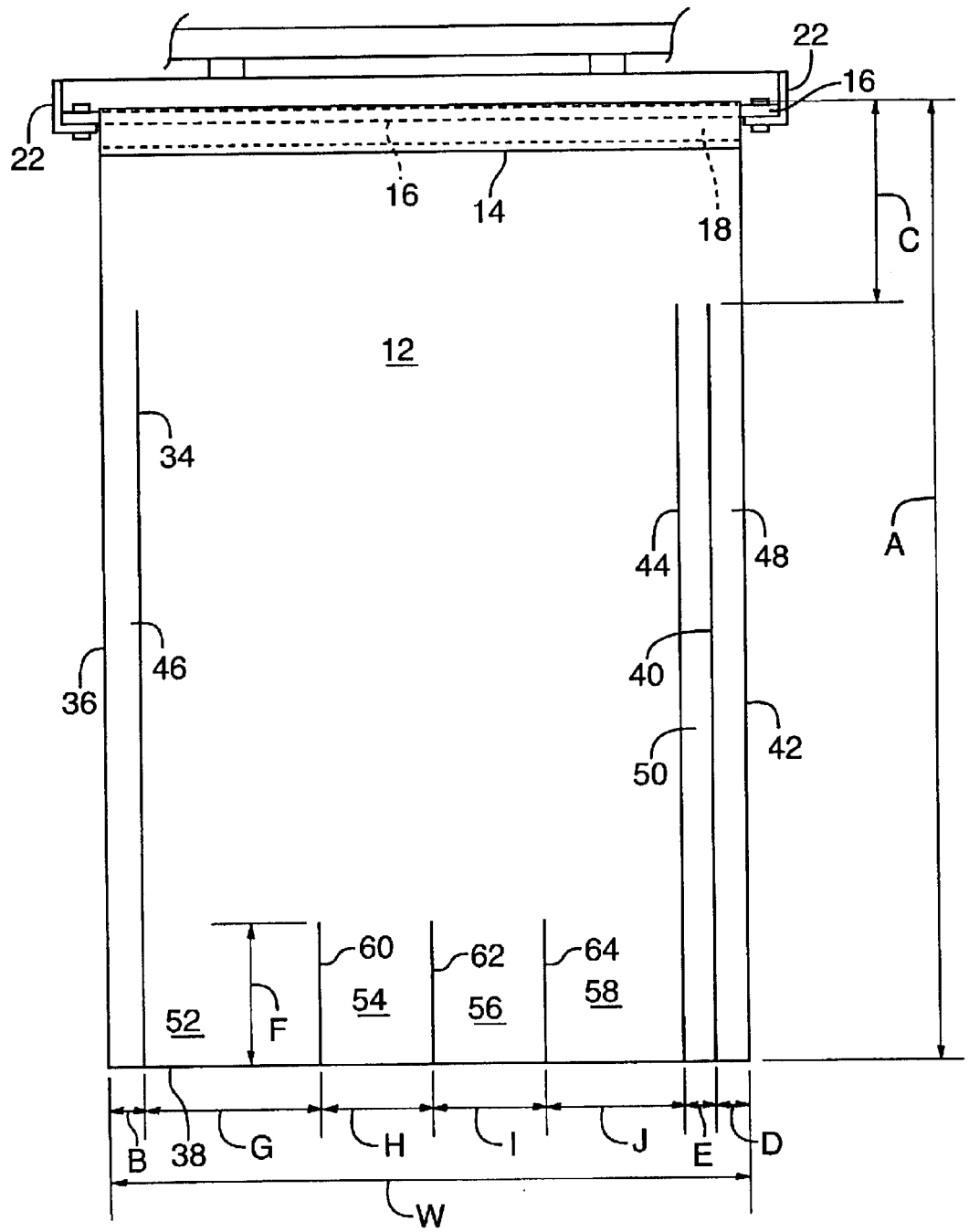
FIG. 3 is an elevational view of one of the curtains, illustrating one example of slitting.

Referring to the drawings and particularly to FIGS. 1, 2 and 3, our overhead washer 10 preferably comprises six generally rectangular curtains 12. The upper edge 14 of each curtain 12 is folded over a pipe rod 16 to form a 3½ inch loop 18 sewn to form a secure attachment. The rods 16 are bolted to a curtain frame 20 comprising a pair of angle members 22 supported by a pair of generally H-shaped arm members 24 pivotally depending from a pair of cross-beams 25 supported by a header beam 26. The members 22 and 24 define a carriage 28 that is supported by the cross-beams 25 and header beam 26. The carriage 28 is transversely reciprocable by a drive mechanism comprising an electric motor 30 and a crank arm 32.

The curtains 12 are suspended into the path of a vehicle (not shown) and are movable transversely across the path of the vehicle to wash it as it is drawn through the apparatus by the usual car wash conveyor. The curtains 12 comprise the usual 5/16 inch thick, flexible, felt-like material sold under the trademark Ozite®.

Each of the curtains 12 hangs a distance A, for example, 86 inches, from its supporting rod 16 into the path of the vehicle. Each curtain 12 is slit in a novel manner that is markedly different from what has been heretofore known. A slit 34 is positioned a distance B, for example five inches, from the left transverse edge 36 of the curtain (the edge adjacent the driver's side of the vehicle). The slit 34 commences a distance C, for example 30 inches, from the supporting rod 16 and extends to the lower edge 38 of the curtain. Thus, the panel 46 in this example is 56 inches long. This longer panel is provided to accommodate radio antennas that extend on the driver's side of the vehicle.

Another slit 40 is positioned a distance D, for example, again five inches, from the right transverse edge 42 of the curtain (the edge adjacent the passenger's side of the vehicle). The slit 40 also commences at the distance C from the rod 16 and extends to the lower edge 38, thus making panel 48 also 56 inches long. A further slit 44 is positioned inwardly of the curtain 12 a distance E, for example, again five inches, from the slit 40. The slit 44 in this example also commences at the distance C from the rod 16 and extends to the lower edge 38. In this example, the slits 34, 40 and 44 thus provide panels 46, 48 and 50 that are each 56 inches long and five inches wide.

Having two such elongated panels at the transverse edge of the curtain at the passenger's side of the vehicle, but only one at the driver's side, provides for radio antennas that are positioned on the passenger's side of vehicles that are of varying widths. The typical conveyor that pulls a vehicle through a car wash installation maintains the driver's side of all vehicles at the same relative position with respect to the washer 10. Differences in vehicle width thus occur at the passenger's side of the washer. Thus, the washer 10 in this example has one elongated panel at the left side of the vehicle and two such elongated panels at the right side.

Referring to FIGS. 1 and 3, a plurality of shorter washing panels 52, 54, 56 and 58 are formed intermediate the panels 46 and 50. Such intermediate panels may be, but are not necessarily all of the same length. However, they are substantially shorter and wider than have been used heretofore. Generally, such intermediate panels are greater than about nine inches in width and less than about 24 inches in length.

As shown in FIG. 3, each curtain 12 may be slit along lines 60, 62 and 64, each commencing a distance F, for example 18 inches, from the lower edge 38, so as to form panels 52, 54, 56 and 58 that are all 18 inches long. Slit 60 is positioned a distance G, for example 19 inches, from slit 34 such that panel 52 is 19 inches wide. Slit 62 is positioned a distance H, for example 12 inches, from slit 60 such that panel 54 is also 12 inches wide. Slit 64 is positioned a distance I, for example 12 inches, from slit 62 such that panel 56 is also 12 inches wide. Inasmuch as the total width W of the curtain is, in this example, 72 inches, the total width of panels 52, 54, 56 and 58 is 57 inches and the width of the remaining intermediate panel 58 is 14 inches.

Figure 3A:
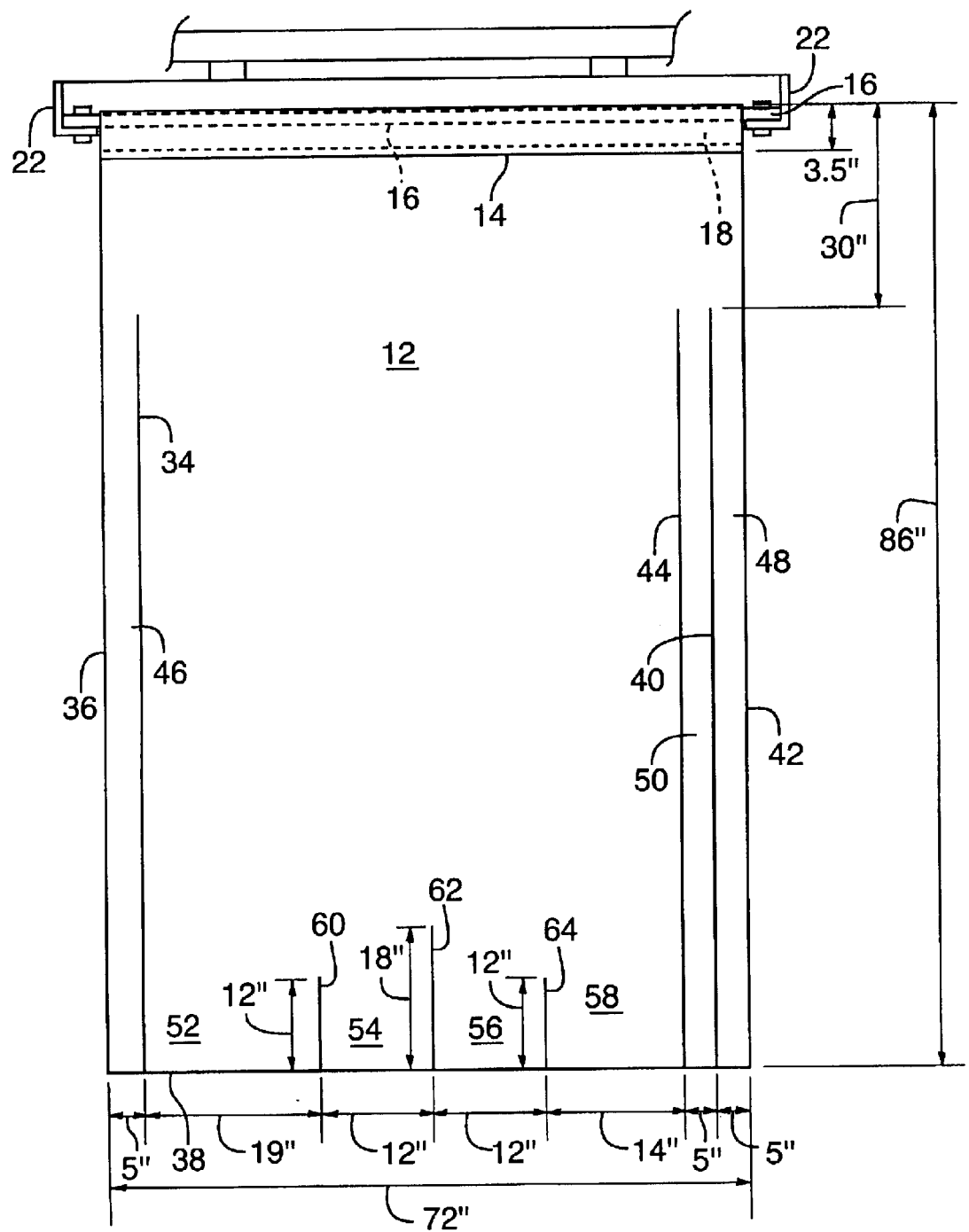
FIG. 3A is an elevational view of another curtain slit somewhat similarly to the curtain shown in FIG. 3, illustrating another example in accordance with the invention and showing the actual panel dimensions.

FIG. 3A illustrates a curtain 12 slit in a manner wherein the panels 52, 54, 56 and 58 are of unequal length. In FIG. 3A slit 60 is made 12 inches long. Slit 62 is made 18 inches long. Slit 64 is made 12 inches long. Thus panels 52 and 58 are each 12 inches long along their inward sides (along slits 60 and 64, respectively). The panels 54 and 56 are 18 inches long on their common side (along slit 62). Each is 12 inches long on its outward side (along slits 60 and 64, respectively). It should be noted that irrespective of the differences in their lengths, the lower edges of panels 46, 48, 50, 52, 54, 56 and 58 all lie in a straight line when the curtain is at rest.

Figure 4:
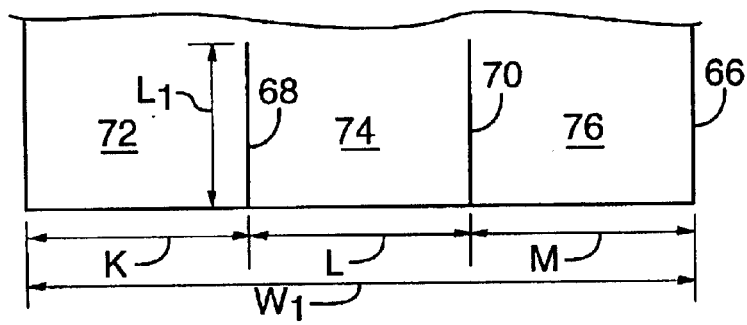
FIGS. 4, 5, 6, 7 and 8 are partial elevational views of curtains illustrating different forms of slitting in accordance with the invention.

In some installations it may be preferred to eliminate the longer panels 46, 48 and 50, thereby to have only shorter panels. An embodiment illustrated in FIG. 4 shows a curtain 66 of width $W_1$, for example 57 inches, slit along lines 68, 70 of length $L_1$, for example 18 inches. Such achieves three panels 72, 74 and 76 of substantially equal widths K, L and M, each 19 inches.

Figure 5:
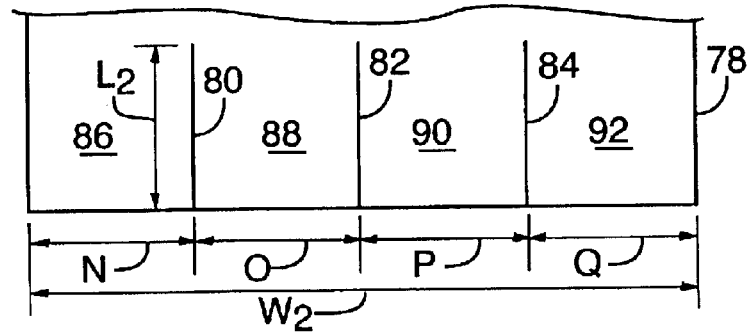

A similar embodiment illustrated in FIG. 5, that also eliminates the longer panels, shows a curtain 78 of width $W_2$, for example, also 57 inches, slit along lines 80, 82 and 84 of length $L_2$, for example 18 inches. Such achieves four panels 86, 88, 90 and 92 of substantially equal widths N, O, P and Q, each 14¼ inches.

Figure 6:
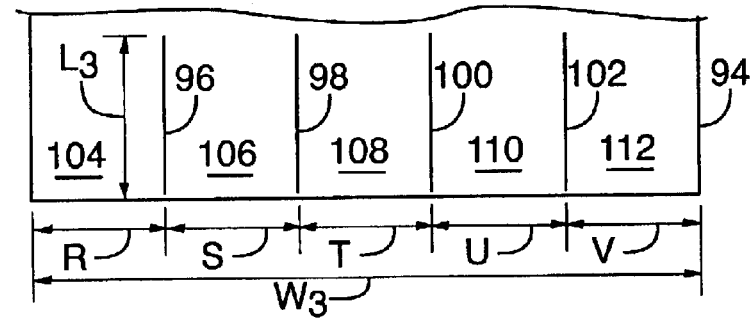

Another similar embodiment illustrated in FIG. 6, also omitting the longer panels, shows a curtain 94 of width $W_3$, for example 57 inches, slit along lines 96, 98, 100 and 102 of length $L_3$, for example 18 inches. Such achieves five panels 104, 106, 108, 110, and 112 of substantially equal widths R, S, T, U and V, each 11.4 inches.

Figure 7:
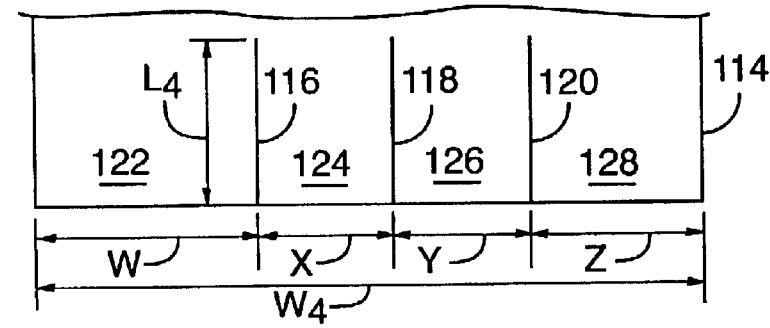

Another embodiment illustrated in FIG. 7 also utilizes only shorter panels, but here the panels are unequal in width. A curtain 114 of width $W_4$, for example 57 inches, is slit along lines 116, 118 and 120 of equal length $L_4$, for example 18 inches. The slits, however, are spaced apart to achieve unequal width panels 122, 124, 126, and 128 of widths W, X, Y and Z, for example 19 inches, 12 inches, 12 inches and 14 inches, respectively.

Figure 8:
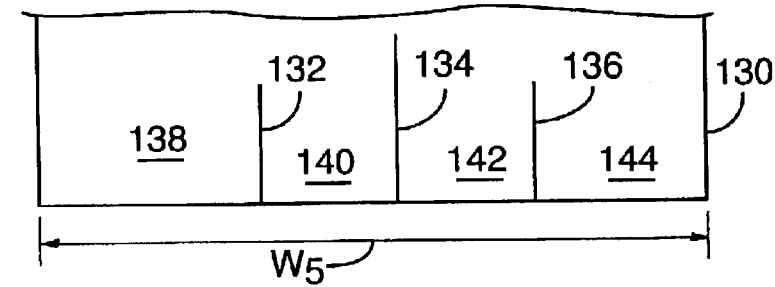

Another embodiment illustrated in FIG. 8 also utilizes only shorter panels, but in this example the panels are unequal in length as well as in width. Illustratively, a curtain 130 of width $W_5$, for example 57 inches, is slit along lines 132, 134 and 136 to achieve panels 138, 140, 142 and 144. Such panels have widths the same as the intermediate panels 52, 54, 56 and 58 in FIG. 3A, namely 19 inches, 12 inches, 12 inches and 14 inches, respectively. In this example, as in the example illustrated in FIG. 3A, slit 132 is 12 inches long, slit 134 is 18 inches long, and slit 136 is 12 inches long. Thus panels 140 and 142 are 18 inches long on their common side along slit 134, and each is 12 inches long on their other sides, along slits 132 and 136, respectively.

Figure 9:
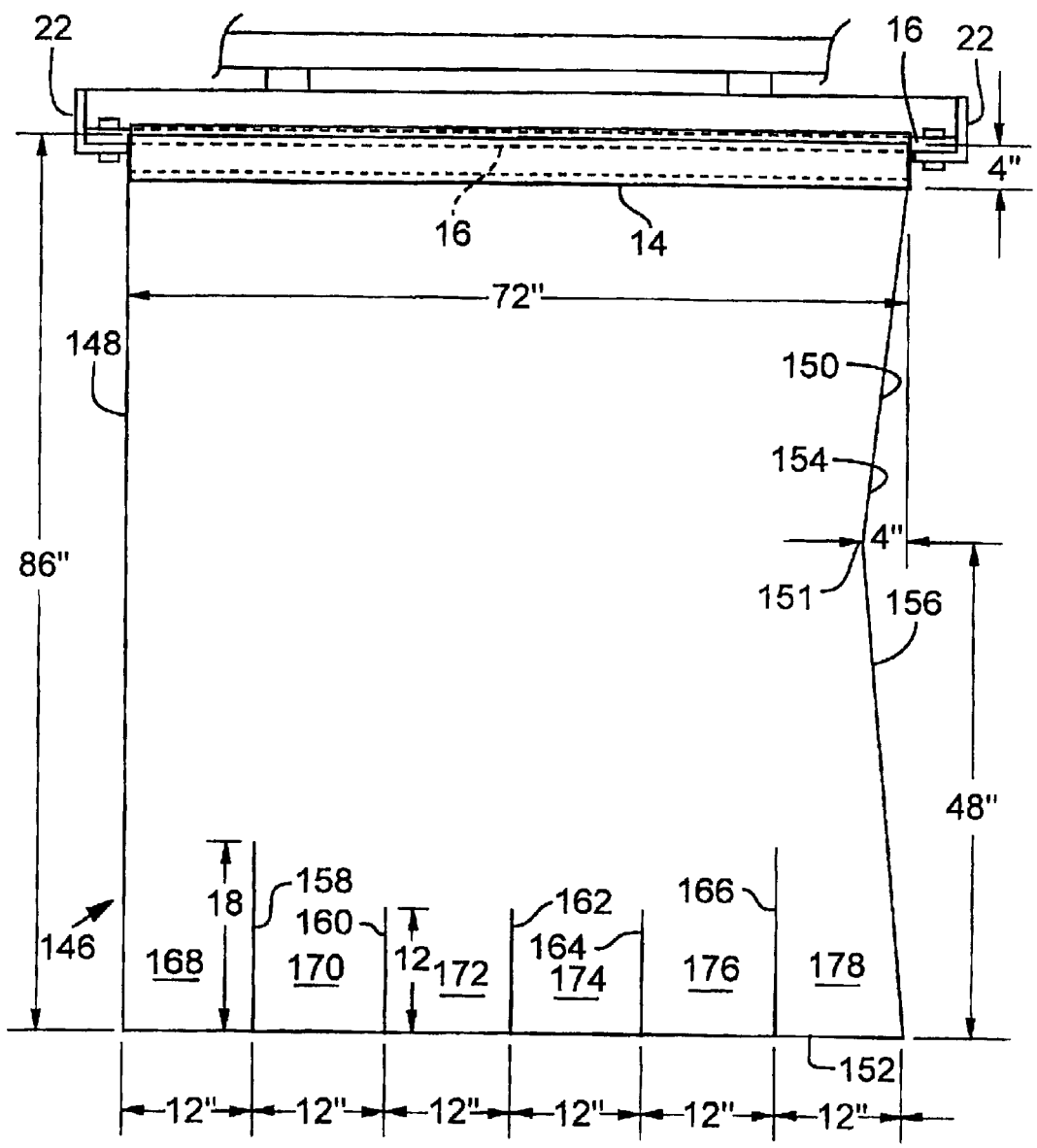
FIG. 9 is an elevational view of a curtain, illustrating another embodiment of the invention.

FIG. 9 illustrates a still further embodiment wherein a curtain 146, is also about 86 inches in length and about 72 inches wide, similarly to curtain 12 illustrated in FIG. 3A. Curtain 146, however, eliminates the longer slits that form longer panels at its transverse edges 148, 150, similarly to the embodiments illustrated in FIGS. 4–8. Rather, transverse edge 150 of curtain 146 is cut such that it is indented about four inches. The indentation 151 is made at about 48 inches up from the curtain's lower edge 152 to form two edges 154, 156 at the passenger's side of the vehicle. Indentation 151 accommodates and takes pressure off vehicle antennas positioned at the passenger's side. Transverse edge 148 is illustrated as not so indented, although it may be if desired.

Lower edge 152 of curtain 146 is then slit along lines 158, 160, 162, 164, 166, such slits being preferably 18 inches, 12 inches, 12 inches, 12 inches and 18 inches in length, respectively. Such slits are cut to form equal width, 12 inch wide lower panels 168, 170, 172, 174, 176 and 178, as shown.

We have found that overhead washers utilizing the invention herein illustrated and described achieve markedly superior cleaning in comparison with previously known washers. It should be understood, however, that the described arrangements are to be deemed simply illustrative of the principles of the invention. Those skilled in the art may devise other arrangements that will embody the principles of the invention and will fall within the spirit and scope of the following claims.

What is claimed is:

1. In a car washing apparatus having an overhead carriage, a support for the carriage, a drive mechanism for moving the carriage back and forth across the path of a vehicle as the vehicle moves through the apparatus, and at least one rectangular curtain suspended from the carriage into the path of the vehicle and transversely to the direction of movement of the vehicle along the path, the one curtain being about 86 inches long, the one curtain being movable by the carriage back and forth transversely across the vehicle to wash the vehicle, the one curtain comprising a sheet of thick, substantially napless, felt-like material unslit at its upper edge, the improvement comprising:

the one curtain being slit at its lower edge to provide at least one flexible elongated panel at one of its transverse edges and a plurality of other panels intermediate the one elongated panel and the opposite edge of the curtain, the one panel at the one transverse edge being substantially longer than the other panels, the other panels being less than about 24 inches in length, the widths of the other panels being unequal, one of the other panels having a width substantially greater than the widths of the remaining other panels, the lower edges of the one panel at the one transverse edge and the other panels lying in a straight line when the one curtain is at rest.

2. The apparatus of claim 1, wherein the one curtain is slit such that the one other panel has a width of about 19 inches.

3. In a car washing apparatus having an overhead carriage, a support for the carriage, a drive mechanism for moving the carriage back and forth across the path of a vehicle as the vehicle moves through the apparatus, and at least one rectangular curtain suspended from the carriage into the path of the vehicle and transversely to the direction of movement of the vehicle along the path, the one curtain being about 86 inches long, the one curtain being movable by the carriage back and forth transversely across the vehicle to wash the vehicle, the one curtain comprising a sheet of thick, substantially napless, felt-like material unslit at its upper edge, the improvement comprising:

the one curtain being slit at its lower edge to provide at least one flexible elongated panel at one of its transverse edges and a plurality of other panels intermediate the one elongated panel and the opposite edge of the curtain, the one panel at the one transverse edge being substantially longer than the other panels, the other panels being less than about 24 inches in length, the one panel at the one transverse edge being about 56 inches long, the lower edges of the one panel at the one transverse edge and the other panels lying in a straight line when the one curtain is at rest.

4. The apparatus of claim 3, wherein the one curtain is slit such that the one panel at the one transverse edge is about five inches in width.

5. In a car washing apparatus having an overhead carriage, a support for the carriage, a drive mechanism for moving the carriage back and forth across the path of a vehicle as the vehicle moves through the apparatus, and at least one rectangular curtain suspended from the carriage into the path of the vehicle and transversely to the direction of movement of the vehicle along the path, the one curtain being about 86 inches long, the one curtain being movable by the carriage back and forth transversely across the vehicle to wash the vehicle, the one curtain comprising a sheet of thick, substantially napless, felt-like material unslit at its upper edge, the improvement comprising:

the one curtain being slit at its lower edge to provide at least one flexible elongated panel at each of its transverse edges and a plurality of panels intermediate the elongated panels, the panels at the transverse edges being substantially longer than the intermediate panels, the intermediate panels being less than about 24 inches in length, the one curtain being slit to achieve one panel at the transverse edge of the curtain positioned at the driver's side of the vehicle about 56 inches long and about five inches wide, the curtain being further slit at the transverse edge positioned at the passenger's side of the vehicle to achieve two panels each about 56 inches long and about five inches wide, the lower edges of the panels at the transverse edges and the intermediate panels lying in a straight line when the one curtain is at rest.

6. The apparatus of claim 5, wherein the one curtain is slit intermediate the one panel at the transverse edge of the curtain positioned at the driver's side of the vehicle and the two panels at the transverse edge of the curtain positioned at the passenger's side of the vehicle to achieve intermediate panels having widths of about 19 inches, 12 inches, 12 inches and 14 inches, respectively, in the direction from the driver's side to the passenger's side of the vehicle.

7. In a car washing apparatus having an overhead carriage, a support for the carriage, a drive mechanism for moving the carriage back and forth across the path of a vehicle as the vehicle moves through the apparatus, and at least one rectangular curtain suspended from the carriage into the path of the vehicle and transversely to the direction of movement of the vehicle along the path, the one curtain being about 86 inches long, the one curtain being movable by the carriage back and forth transversely across the vehicle to wash the vehicle, the one curtain comprising a sheet of thick, substantially napless, felt-like material unslit at its upper edge, the improvement comprising:

the one curtain being cut at least along one of its transverse edges to provide an indentation intermediate the upper and lower edges of the curtain, the one curtain being slit at the lower edge thereof to form a plurality of flexible rectangular washing panels positioned transversely of the curtain, the curtain being slit such that the panels are less than about 24 inches in length, the lower edges of the panels lying in a straight line when the curtain is at rest.

8. The apparatus of claim 7, wherein the one curtain is slit such that the widths of the panels are substantially equal.

9. The apparatus of claim 7, wherein the one curtain is slit such that the lengths of the panels are unequal.

10. The apparatus of claim 7, wherein the one curtain is cut at the transverse edge positioned at the passenger's side of the vehicle to provide the indentation at the passenger's side of the vehicle.

11. The apparatus of claim 10, wherein the indentation is positioned about 48 inches above the lower edge of the one curtain.

12. The apparatus of claim 7, wherein the one curtain is slit intermediate the driver's side of the vehicle and the passenger's side of the vehicle to achieve six intermediate panels each substantially 12 inches wide.

13. The apparatus of claim 7, wherein the one curtain is slit along its lower edge from the driver's side of the vehicle to the passenger's side of the vehicle along lines 18 inches, 12, 12, 12 and 18 inches long, respectively.

* * * * *